United States Patent [19]

Parker

[11] 4,177,104
[45] Dec. 4, 1979

[54] APPARATUS FOR SEPARATING LAMINATED LAYERS

[75] Inventor: Robert H. Parker, Thiensville, Wis.
[73] Assignee: W. H. Brady Co., Milwaukee, Wis.
[21] Appl. No.: 851,307
[22] Filed: Nov. 14, 1977
[51] Int. Cl.² .................. B32B 35/00; B32B 07/12
[52] U.S. Cl. ........................................ 156/584; 156/344
[58] Field of Search ................. 196/584, 344, 443; 221/73

[56] References Cited

U.S. PATENT DOCUMENTS

| | | | |
|---|---|---|---|
| 2,422,998 | 6/1947 | Adams et al. | 156/224 |
| 2,754,994 | 7/1956 | Cole | 156/584 X |
| 3,107,814 | 10/1963 | Auger et al. | 221/73 |
| 3,266,797 | 8/1966 | Stievenart | 156/584 X |
| 3,487,977 | 1/1970 | Andersson | 156/344 X |
| 3,530,494 | 9/1970 | Baratta | 221/73 X |
| 3,793,123 | 2/1974 | Aronson | 156/584 |

*Primary Examiner*—John T. Goolkasian
*Assistant Examiner*—Thomas Bokan

[57] ABSTRACT

Laminate layers, such as a label and its liner, are separated by bending lengthwise-adjacent portions of the laminate end in opposite directions to cause shearing and lengthwise offset between the layers, and then releasing the end, the overall orientation being such that, upon release of the end, a differential in the forces that tend to straighten the layers drives apart the shear-weakened adhesive bond.

2 Claims, 5 Drawing Figures

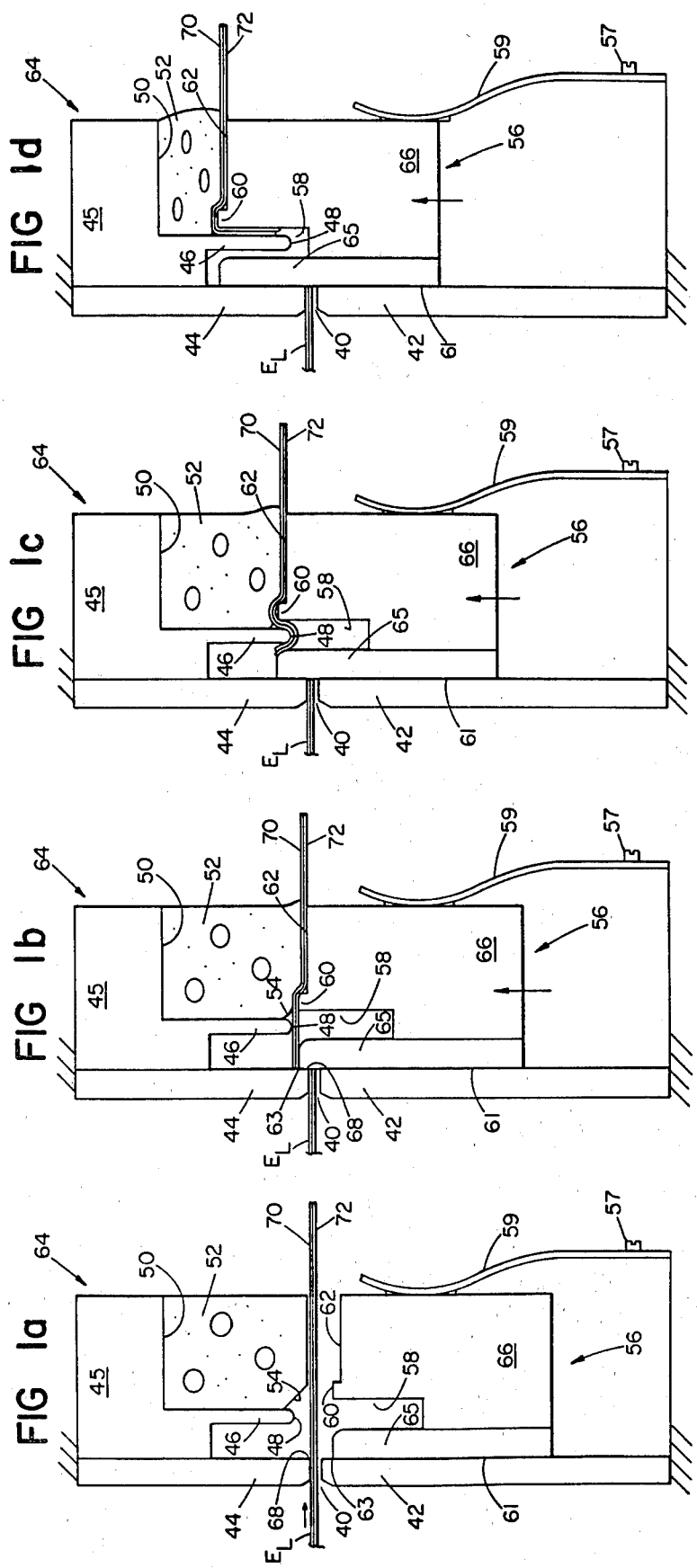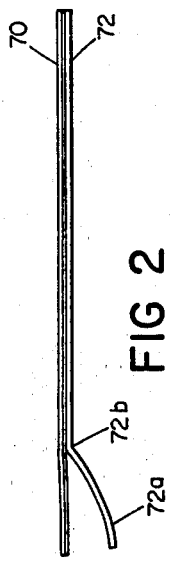

APPARATUS FOR SEPARATING LAMINATED LAYERS

FIELD OF THE INVENTION

This invention relates to separating element layer from other layers to which they are adhered; e.g., to removing labels from liners.

BACKGROUND OF THE INVENTION

It is well known in the art to remove labels adhered with pressure-sensitive adhesive to a continuous liner by directing the liner around a sharp bend so that the stiffness of the label in tending to resist bending imposes forces in tension causing at least partial separation of the label leading edge; e.g., Cole U.S. Pat. No. 2,754,994. Employing this principle necessitates maintaining guide control of a portion of the liner downstream (i.e., in advance) of the leading edge of the label.

In a U.S. patent application Ser. No. 850,266, filed Nov. 10, 1977 by Frederic Samuel Tobey, entitled Separating Laminated Layers and hereby incorporated herein by reference, there is disclosed Tobey's discovery that leading edges of discrete elements such as label layers may be removed from liner layers to which they are adhered by directing both layers at an end of an element-liner laminate around a sharp bend to cause shearing and length-wise offset between the layers, and then releasing the end, the overall orientation being such that, upon release of the end, a differential in the forces that tend to straighten the layers drives apart the shear-weakened adhesive bond.

SUMMARY OF THE INVENTION

I have discovered that Tobey's method may advantageously be practiced by bending lengthwise-adjacent portions of the laminate end in opposite directions to produce the shearing and lengthwise offset between layers. Among other advantages, this allows larger portions of the layer ends to be separated than when only one bend is used.

In a preferred embodiment of the invention a finger-like member is used to force the end portion of the laminate into a cavity to produce a 180° bend in one direction next to a sharper 90° bend in the opposite direction, the 180° bend being closest to the end of the laminate.

PREFERRED EMBODIMENT

I turn now to a presently-preferred embodiment of the invention.

DRAWINGS

There is shown in:

FIGS. 1 (a)-(d) four side-view steps in the use of a most preferred embodiment; and FIG. 2 a side view of a label-liner element after removal from the step of FIG. 1(d).

DESCRIPTION

The embodiment described in the drawings and its operation are now described.

1. Embodiment

IN FIGS. 1(a)-(d) is shown an end $E_L$ from a continuous roll of label-liner laminate (0.010 inches thick) entering through slot 40 between stationary metal portions 42 and 44. Secured to portion 44 is Delrin element 45 including depending plate portion 46 (0.035 inches in thickness and 0.203 inches long) and with semi-cylindrical end 48. Secured to horizontal surface 50 of element 45, is block 52 of closed cell Neoprene (material manufactured by Irving B. Moore Corp., Cambridge, Massachusetts under its No. R431-N) downwardly relieved by inclined planar surface 54. Block 52 is 0.325 inches high, 0.260 inches wide at its top, and 0.214 inches wide at its bottom, and surface 54 begins 0.046 inches from the bottom of the block. Beneath the elements just described is a vertically reciprocable deforming and cutting element indicated generally at 56, in the upper portion of which is groove 58, 0.065 inches in width and 0.233 inches deep, defined between metal blade 65 and Delrin element 66 secured to blade 65 (by means not shown.). Just downstream of groove 58, in Delrin element 66, are ridge 60 (0.015 inches high, 0.045 inches wide) and flat 62 (0.205 inches wide). Leaf spring 59, held in place by screws 57 (only one shown), biases surface 61 including cutting edge 63 against the inner surface of portion 42, and slides easily on the low-friction surface of Delrin portion 66.

2. Operation

In operation, label laminate end $E_L$ is moved as part of a roll through slot 40 and between the upper and lower cutting and deforming units, indicated generally at 64 and 65. When it is positioned to provide the desired length of finished label, cutting and deforming unit 56 is moved upwardly as shown successively in FIGS. 1(b) through (d). First, as shown in FIG. 1(b), the label is cut between edges 63 and 68, which are at an angle of 8° for good "scissoring" or guillotine shearing action. The semi-cylindrical surface 48 then engages the upper surface of the label laminate, against label layer 70. The curved and slippery character of surface 48 counteracts any tendency to draw material in an upstream direction past ridge 60. Sponge element 52, which clamps the downstream end of the label laminate against movement in an upstream direction, beginning even as plate 46 engages the laminate, is compressed further and further, to hold with more and more force, to prevent upstream movement of the laminate into the slot 58. Ridge 60 is of great help to this end. The relief at surface 54 prevents the sponge from being forced into slot 58. A bend in the laminate of 180° is produced around surface 48, and a sharper bend of 90° in the opposite direction is produced around the 90° sharp upstream edge of ridge 60, as shown in FIGS. 1(c) and 1(d). It is important that in this final stage the end be able to free itself of control by the semi-cylindrical edge, as by fixing its length as assure clearing (FIG. 1(d)). The product is shown in FIG. 2, the label 70 with its greater memory having gone back toward straight, and the liner 72 retaining at 72a much of the bend given it during the movement around the plate, as well as a sharper bend 72b in the opposite direction given it at ridge 60, the tension resulting from the latter having caused the bond weakened by the shear created in bending to snap apart at the stage shown in FIG. 2, even though the liner memory at 72a urges it toward label 70.

Features of the embodiment disclosed but not claimed herein, including sponge 52 and cooperating ridge 60 and flat 62, and the combined cutting and bending actions, were the invention of Frederic Samuel Tobey.

I claim:

1. Apparatus for separating layers of a laminate at an end thereof, comprising
    means for supporting said laminate to permit bending thereof at said end, and
    means for bending both said layers sharply in one direction at one portion of said laminate close to said end, and bending both said layers sharply in the opposite direction at a lengthwise-adjacent portionof said laminate closer to said end, to cause shearing and lengthwise offset between said layer, and then releasing both said layers at said end to permit them to spring back from said bending.

2. Apparatus according to claim 1 wherein said means comprises a first member providing a narrow cavity, and a second member, narrower than said cavity, for forcing an end portion of said laminate into said cavity, to produce a 180° bend in one direction next to a sharper 90° bend in the opposite direction, the 180° bend being closest to the end of the laminate.

* * * * *